United States Patent
Zur Loye et al.

(10) Patent No.: US 10,161,325 B2
(45) Date of Patent: Dec. 25, 2018

(54) THERMAL MANAGEMENT CONTROL USING LIMITED BANK OPERATION

(71) Applicant: Cummins IP, Inc., Minneapolis, MN (US)

(72) Inventors: Axel O. Zur Loye, Columbus, IN (US); Colin L. Norris, Columbus, IN (US); Timothy P. Lutz, Columbus, IN (US); Richard J. Ancimer, Columbus, IN (US); Abhishek Mehrotra, Columbus, IN (US)

(73) Assignee: Cummins IP, Inc., Columbus, IN (US)

( * ) Notice: Subject to any disclaimer, the term of this patent is extended or adjusted under 35 U.S.C. 154(b) by 7 days.

(21) Appl. No.: 14/759,311

(22) PCT Filed: Jan. 8, 2014

(86) PCT No.: PCT/US2014/010678
§ 371 (c)(1),
(2) Date: Jul. 6, 2015

(87) PCT Pub. No.: WO2014/110130
PCT Pub. Date: Jul. 17, 2014

(65) Prior Publication Data
US 2015/0354484 A1 Dec. 10, 2015

Related U.S. Application Data

(60) Provisional application No. 61/750,715, filed on Jan. 9, 2013.

(51) Int. Cl.
*F02D 41/00* (2006.01)
*F02B 75/22* (2006.01)
(Continued)

(52) U.S. Cl.
CPC .......... *F02D 41/0082* (2013.01); *F02B 75/22* (2013.01); *F02D 17/02* (2013.01);
(Continued)

(58) Field of Classification Search
CPC ..... F02B 75/22; F02D 41/029; F02D 41/0082
See application file for complete search history.

(56) References Cited

U.S. PATENT DOCUMENTS 4,146,006 A * 3/1979 Garabedian ............. F02D 17/02
123/198 F
4,383,515 A * 5/1983 Higashiyama ...... F02D 41/0087
123/478

(Continued)

FOREIGN PATENT DOCUMENTS

DE 20 2012 104 300 U1 12/2012
DE 10202012104300 12/2012
(Continued)

OTHER PUBLICATIONS

International Search Report and Written Opinion for International Application No. PCT/US2014/010678, dated May 12, 2014, 9 pages.
(Continued)

*Primary Examiner* — Hieu T Vo
*Assistant Examiner* — Sherman Manley
(74) *Attorney, Agent, or Firm* — Foley & Lardner LLP (57) ABSTRACT

Disclosed herein is an apparatus for managing combustion in an internal combustion engine that includes an operating condition module configured to determine an operating load of an internal combustion engine. The internal combustion engine can includes multiple banks of cylinders. The apparatus further includes a cylinder bank control module configured to select at least one bank of cylinders of the multiple banks of cylinders to be operational based on the determined
(Continued)

operating load of the engine. The apparatus also includes a cylinder bank command module configured to generate a cylinder bank command based on a cylinder bank control instruction received from the cylinder bank control module, the cylinder bank control instruction comprising the selection of the at least one operational bank of cylinders.

20 Claims, 3 Drawing Sheets (51) Int. Cl.
F02D 17/02 (2006.01)
F02D 41/02 (2006.01)
F02D 41/14 (2006.01)
F02B 37/00 (2006.01)
F02B 37/007 (2006.01)

(52) U.S. Cl.
CPC ..... *F02D 41/0087* (2013.01); *F02D 41/0245* (2013.01); *F02B 37/001* (2013.01); *F02B 37/007* (2013.01); *F02D 41/029* (2013.01); *F02D 41/0275* (2013.01); *F02D 41/1446* (2013.01); *Y02T 10/26* (2013.01)

(56) References Cited

U.S. PATENT DOCUMENTS

| | | | | |
|---|---|---|---|---|
| 4,976,228 | A * | 12/1990 | Kawamura | F01L 9/04 123/198 F |
| 5,720,257 | A * | 2/1998 | Motose | F02D 17/02 123/339.14 |
| 5,778,858 | A * | 7/1998 | Garabedian | F02D 41/1443 123/481 |
| 6,164,065 | A * | 12/2000 | Denari | B01D 53/9431 60/284 |
| 6,415,601 | B1 | 7/2002 | Glugla et al. | |
| 6,857,264 | B2 | 2/2005 | Ament | |
| 6,868,667 | B2 * | 3/2005 | Surnilla | F02D 41/0087 123/198 F |
| 6,922,986 | B2 * | 8/2005 | Rozario | F02D 41/0087 123/198 F |
| 6,938,410 | B2 | 9/2005 | Glugla et al. | |
| 7,044,107 | B1 * | 5/2006 | Duty | F01L 13/0005 123/196 R |
| 7,360,356 | B2 * | 4/2008 | Narita | F01N 3/0821 123/198 F |
| 7,854,114 | B2 * | 12/2010 | England | F02D 41/0245 60/284 |
| 8,176,891 | B2 * | 5/2012 | Choi | F02D 17/02 123/197.4 |
| 9,074,549 | B1 * | 7/2015 | zur Loye | F01N 3/035 |
| 9,732,686 | B2 * | 8/2017 | Glugla | F02D 41/0055 |
| 2002/0189592 | A1 | 12/2002 | Nishigaki | |
| 2003/0101961 | A1 | 6/2003 | Foster | |
| 2003/0221417 | A1 * | 12/2003 | Surnilla | F01N 3/2006 60/284 |
| 2007/0051351 | A1 * | 3/2007 | Pallett | F02D 17/02 123/692 |
| 2009/0249770 | A1 * | 10/2009 | Ogiso | F01N 3/0253 60/287 |
| 2010/0004847 | A1 * | 1/2010 | Katoh | F02D 41/0025 701/103 |
| 2011/0168131 | A1 | 7/2011 | McDonald et al. | |
| 2011/0220068 | A1 | 9/2011 | Ferch et al. | |
| 2012/0216528 | A1 | 8/2012 | Robinson | |
| 2016/0186672 | A1 * | 6/2016 | Mehrotra | F01N 3/2006 60/274 |

FOREIGN PATENT DOCUMENTS

| | | |
|---|---|---|
| EP | 1 612 393 | 1/2006 |
| EP | 1 710 423 | 10/2006 |
| EP | 1 258 619 | 11/2012 |
| GB | 2 478 541 | 9/2011 |

OTHER PUBLICATIONS

Search Report for European Patent Application No. 14737990.3, dated Sep. 6, 2016, 10 pages.
European Office Action Issued for EP Application No. 14737990.3, dated Apr. 19, 2017, 4 pages.

* cited by examiner

THERMAL MANAGEMENT CONTROL USING LIMITED BANK OPERATION

CROSS-REFERENCE TO RELATED APPLICATION

This application claims the benefit of U.S. Provisional Patent Application No. 61/750,715, filed Jan. 9, 2013, which is incorporated herein by reference.

FIELD

The present disclosure relates to internal combustion engines, and more particularly relates to controlling the exhaust temperature generated by an internal combustion engine.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards, to which engines must comply. Generally, emission requirements vary according to engine type. Emission tests for compression-ignition (diesel) engines typically monitor the release of diesel particulate matter (PM), nitrogen oxides ($NO_x$), and unburned hydrocarbons (UHC).

Exhaust aftertreatment systems receive and treat exhaust gas generated by an internal combustion engine. Typical exhaust aftertreatment systems include any of various components configured to reduce the level of regulated exhaust emissions present in the exhaust gas. For example, some exhaust aftertreatment systems for diesel powered internal combustion engines include various components, such as a diesel oxidation catalyst (DOC), particulate matter filter or diesel particulate filter (DPF), and a selective catalytic reduction (SCR) catalyst. In some exhaust aftertreatment systems, exhaust gas first passes through the diesel oxidation catalyst, then passes through the diesel particulate filter, and subsequently passes through the SCR catalyst.

A common DPF comprises a porous ceramic matrix with parallel passageways through which exhaust gas passes. Particulate matter subsequently accumulates on the surface of the filter, creating a buildup which must eventually be removed to prevent obstruction of the exhaust gas flow. Common forms of particulate matter are ash and soot. Ash, typically a residue of burnt engine oil, is substantially incombustible and builds slowly within the filter. Soot, chiefly composed of carbon, results from incomplete combustion of fuel and generally comprises a large percentage of particulate matter buildup. Various conditions, including, but not limited to, engine operating conditions, duty cycles, hours of operation, mileage, driving style, terrain, etc., affect the rate at which particulate matter accumulates within a diesel particulate filter.

Accumulation of particulate matter typically causes backpressure within the exhaust system. Excessive backpressure on the engine can degrade engine performance. Particulate matter, in general, oxidizes in the presence of $NO_2$ at modest temperatures, or in the presence of oxygen at higher temperatures. If too much particulate matter has accumulated when oxidation begins, the oxidation rate may get high enough to cause an uncontrolled temperature excursion. The resulting heat can destroy the filter and damage surrounding structures. Recovery can be an expensive process.

To prevent potentially damaging situations, accumulated particulate matter is commonly oxidized and removed in a controlled regeneration process before excessive levels have accumulated. To oxidize the accumulated particulate matter, filter temperatures generally must exceed the temperatures typically reached at the filter inlet. Consequently, additional methods to initiate regeneration of a diesel particulate filter may be used. In one method, a reactant, such as diesel fuel, is introduced into an exhaust after-treatment system to increase the temperature of the filter and initiate oxidation of particulate buildup. A filter regeneration event occurs when substantial amounts of soot are consumed on the particulate filter.

A controlled regeneration can be initiated by the engine's control system for example when a predetermined amount of particulate has accumulated on the filter, when a predetermined time of engine operation has passed, when the backpressure exceeds a predetermined value, or when the vehicle has driven a predetermined number of miles. Oxidation from oxygen ($O_2$) generally occurs on the filter at temperatures above about 400 degrees centigrade (C), while oxidation from nitric oxides ($NO_2$), sometimes referred to herein as noxidation, generally occurs at temperatures between about 250 C and 400 C. Controlled regeneration typically consists of driving the filter temperature up to $O_2$ oxidation temperature levels for a predetermined time period such that oxidation of soot accumulated on the filter takes place. The temperature of the particulate filter is dependent upon the temperature of the exhaust gas entering the particulate filter. Accordingly, the temperature of the exhaust must be carefully managed to ensure that a desired particulate filter inlet exhaust temperature is accurately and efficiently reached and maintained for a desired duration to achieve a controlled regeneration event that produces desired results.

The SCR catalyst reduces the amount of nitrogen oxides ($NO_x$) present in the exhaust gas. Generally, the SCR catalyst is configured to reduce $NO_x$ into constituents, such as $N_2$ and $H_2O$, in the presence of ammonia ($NH_3$). Because ammonia is not a natural byproduct of the combustion process, it must be artificially introduced into the exhaust gas prior to the exhaust gas entering the SCR catalyst. Typically, ammonia is not directly injected into the exhaust gas due to logistical and, in turn, economic considerations. Accordingly, conventional systems are designed to inject a reductant (e.g., diesel exhaust fluid (DEF), ammonia, metal chloride salt, etc.) into the exhaust gas, which is capable of decomposing into gaseous ammonia in the presence of exhaust gas under certain conditions. The reductant commonly used by conventional exhaust aftertreatment systems is DEF, which is a urea-water solution.

Generally, the decomposition of reductant into gaseous ammonia occupies three stages. First, the reductant mixes with exhaust gas and water is removed from the reductant through a vaporization process. Second, the temperature of the exhaust causes a thermolysis-induced phase change in the reductant and decomposition of the reductant into isocyanic acid (HNCO) and $NH_3$. Third, the isocyanic acid reacts with water in a hydrolysis process to decompose into ammonia and carbon dioxide ($CO_2$). The gaseous ammonia is then introduced at the inlet face of the SCR catalyst, flows through the catalyst, and is consumed in the $NO_x$ reduction process. Any unconsumed ammonia exiting the SCR system can be reduced to $N_2$ and other benign components using an ammonia oxidation catalyst.

SCR systems typically include a reductant source and a reductant injector or doser coupled to the source and positioned upstream of the SCR catalyst. The reductant injector injects reductant into a decomposition space or tube through which an exhaust gas stream flows. Upon injection into the exhaust gas stream, the injected reductant spray is heated by the exhaust gas stream to trigger the decomposition of reductant into ammonia. As the reductant and exhaust gas mixture flows through the decomposition tube, the reductant further mixes with the exhaust gas before entering an the SCR catalyst. Ideally, reductant is sufficiently decomposed and mixed with the exhaust gas prior to entering the SCR catalyst to provide an adequately uniform distribution of ammonia at the inlet face of the SCR catalyst.

Some prior art exhaust aftertreatment systems, however, do not provide adequate decomposition and mixing of injected reductant. Often, conventional systems cause low temperature regions within the decomposition tube. Further, during low load operating conditions, the temperature of the exhaust gas may be relatively low. Low temperature exhaust gas and regions within the exhaust gas may result in inadequate mixing or decomposition, which may lead to the formation of solid reductant-based or UHC deposits on the inner walls of the decomposition tube and reductant-based injector. Solid reductant-based deposits include the solid byproducts from incomplete decomposition of urea, such as biuret, cyanuric acid, ammelide, and ammeline, and UHC deposits include UHC adsorbed by the SCR catalyst. Additionally, inadequate mixing may result in a low reductant vapor uniformity index, which can lead to uneven distribution of the reductant across the SCR catalyst surface, lower $NO_x$ conversion efficiency, and other shortcomings. The formation of solid reductant-based deposits within the decomposition tube typically results in a lower amount of ammonia concentration and a lower ammonia distribution uniformity index at the inlet face of the SCR catalyst, which can degrade the performance and control of the SCR catalyst. Additionally, solid reductant-based deposits in the decomposition tube can induce exhaust backpressure within the exhaust aftertreatment system, which can adversely impact the performance of the engine and exhaust aftertreatment system.

Some conventional systems recognize the negative effect of reductant-based deposit buildup on the SCR catalyst and other SCR components caused by low exhaust temperatures. Such systems employ regeneration techniques to increase the temperature of the exhaust in the SCR system to regenerate the SCR catalyst and remove the reductant-based deposits from the SCR catalyst.

Conventional systems use various strategies for managing the particulate filter and SCR system inlet exhaust temperatures. For example, some systems use a combination of air handling strategies, internal fuel dosing strategies, and external fuel dosing strategies.

The air handling strategies include managing an air intake throttle to regulate the air-to-fuel ratio. Lower air-to-fuel ratios, e.g., richer air/fuel mixtures, typically produce higher engine output exhaust temperatures.

Internal fuel dosing strategies include injecting additional fuel into the compression cylinders. Such in-cylinder injections include pre-injections or fuel injections occurring before a main fuel injection and post-injections or fuel injection occurring after a main fuel injection. Generally, post-injections include heat post-injections and non-heat post-injections. Heat post-injections are injections that participate along with the main fuel injection in the combustion event within the cylinder and occur relatively soon after the main fuel injection. Non-heat post injections are injections that occur later in the duty cycle compared to the heat post-injections and do not participate in the combustion event within the cylinder.

External fuel dosing strategies include injecting fuel into the exhaust gas stream at locations downstream of the engine. Typically, external fuel dosers are positioned in the exhaust aftertreatment system between the engine and a catalytic component, e.g., the DOC. The DOC reduces the number of pollutants in the exhaust gas through an oxidation process prior to the gas entering the particulate filter. The catalyst of the catalytic component must be at a specific temperature for oxidation of the pollutants to occur. The oxidation process heats the exhaust and causes the temperature of the exhaust to increase. In other words, during an oxidation process on the DOC, the DOC outlet exhaust temperature typically is greater than the DOC inlet exhaust temperature. Because fuel in the exhaust participates in the oxidation process, the exhaust temperature differential across the DOC, and thus the DOC outlet exhaust temperature, is largely dependent upon the amount of fuel in the exhaust gas entering the DOC.

Air handling strategies are aimed at controlling engine output exhaust temperatures. Internal fuel dosing strategies affect both engine output exhaust temperatures and DOC outlet exhaust temperatures. Fuel from internal fuel injections not combusted in the combustion event is oxidized in the DOC and increases the DOC outlet exhaust temperature. Similarly, external fuel injections simply add fuel to the exhaust stream, and thus increase the DOC outlet exhaust temperature.

In typical systems, the particulate filter receives exhaust directly from the DOC. Accordingly, the particulate filter inlet exhaust temperature is approximately equal to the DOC outlet exhaust temperature. Therefore, an important tool in achieving a desired particulate filter inlet exhaust temperature is to ensure that the DOC is operating at the proper temperature for oxidation to occur. Because the temperature of the catalytic component is dependent upon the engine output exhaust temperature, many conventional engine systems employ various methods for controlling engine output exhaust temperature. However, such conventional methods can have several shortcomings. For example, for some mid-range engines operating under low load conditions and urban-type driving conditions (e.g., start-stop driving conditions with long periods of idle engine running), the engine output exhaust temperature control methods for such engines may be unable to achieve the engine output exhaust temperatures necessary to reach DOC activation temperatures. Moreover, when the engine is operating under low ambient air temperatures, it may be even more difficult for conventional engine output exhaust temperature control methods to attain adequately high engine output exhaust temperatures. When the DOC activation temperatures are not reached, the particulate filter may not adequately be able to regenerate, possibly resulting in an increase in backpressure from the accumulation of particulate, and a possibility of an uncontrolled regeneration event that may damage the DPF.

SUMMARY

The subject matter of the present application has been developed in response to the present state of the art, and in particular, in response to the problems and needs in the art that have not yet been fully solved by currently available controllers or thermal management control strategies for internal combustion engines. Accordingly, the subject matter of the present application has been developed to provide a controller or control strategy that overcomes at least some shortcomings of the prior art. More specifically, disclosed herein is an improved thermal management control strategy for an internal combustion engine that promotes higher exhaust temperatures and higher exhaust temperature increase rates during low load operating conditions.

According to one embodiment, an apparatus for controlling the exhaust temperature generated by an internal combustion engine includes an operating condition module configured to determine an operating load of an internal combustion engine. The internal combustion engine can include a plurality of banks of cylinders. The apparatus can also include a cylinder bank control module configured to select at least one bank of cylinders of the plurality of banks of cylinders to be operational based on the determined operating load of the engine. The apparatus additionally includes a cylinder bank command module configured to generate a cylinder bank command based on a cylinder bank control instruction received from the cylinder bank control module. The cylinder bank control instruction can include the selection of the at least one operational bank of cylinders.

In some implementations of the apparatus, the cylinder bank control module selects an operating mode associated with the engine. The operating mode can include one of a normal operating mode and a limited bank operating mode such that, in the normal operating mode, all banks of cylinders of the plurality of banks of cylinders are enabled, and, in the limited bank operating mode, operation of a first bank of cylinders of the plurality of banks of cylinders is at least partially disabled and operation of a second bank of cylinders of the plurality of banks of cylinders is enabled. In various other implementations, the limited bank operating mode includes the complete disablement of the first bank of cylinders of the plurality of banks of cylinders and the enabled operation of the second bank of cylinders of the plurality of banks of cylinders.

In a further implementation of the apparatus, the cylinder bank control module disables operation in the limited bank operating mode in response to operating under a particular operating condition. The cylinder bank control module selects at least one bank of cylinders to be disabled in response to the operating load being below a predetermined load threshold. In certain implementations, a switch module is configured to switch operation of a bank of cylinders during operation of the engine in a limited bank operating mode in response to an operating time threshold being reached such that an operational bank of cylinders is disabled and a disabled bank of cylinders is made operational. The operating time threshold can include a temperature time threshold or a wear time threshold.

According to certain implementations of the apparatus, the operating condition module receives input from a sensor to determine the operating load of the engine, the sensor operatively connected to the engine. In a further implementation of the apparatus, the cylinder bank command module comprises a plurality of fueling maps associated with an operating mode of the engine. At least one fueling map can be associated with operation of all banks of cylinders of the plurality of banks of cylinders and at least one different fueling map can be associated with operation of a bank of cylinders of the plurality of banks of cylinders and at least the disablement of a bank of cylinders of the plurality of banks of cylinders.

In another implementation of the apparatus, a fueling map associated with the limited bank operating mode defines an allocation of fuel injected into a cylinder, wherein fuel is injected into a cylinder of an operational bank of cylinders and no fuel is injected into a cylinder of a completely disabled bank of cylinders. In yet another implementation of the apparatus, the cylinder bank command is sent to a component of the engine. The engine component can be actuated according to a predetermined value to produce a desired operating condition in response to receiving the cylinder bank command. The cylinder bank command can include the predetermined value.

In another embodiment, a method for controlling the exhaust temperature generated by an internal combustion engine includes determining an operating load of an internal combustion engine. The internal combustion engine can include a plurality of banks of cylinders. The method also includes selecting at least one bank of cylinders of the plurality of banks of cylinders to be operational based on the determined operating load or other condition (e.g., DOC inlet temperature) of the engine. The method additionally includes generating a cylinder bank command based on a cylinder bank control instruction received from the cylinder bank control module. The cylinder bank control instruction can include the selection of the at least one operational bank of cylinders.

In some implementations, the method includes selecting an operating mode associated with the engine. The operating mode can include one of a normal operating mode and a limited bank operating mode such that, in the normal operating mode, all banks of cylinders of the plurality of banks of cylinders are enabled, and, in the limited bank operating mode, operation of a first bank of cylinders of the plurality of banks of cylinders is at least partially disabled and operation of a second bank of cylinders of the plurality of banks of cylinders is enabled.

In a further implementation of the method, the method disables operation in the limited bank operating mode in response to operating under a particular operating condition. The method further includes selecting at least one bank of cylinders to be disabled in response to the operating load being below a predetermined load threshold. In certain implementations, the method includes switching operation of a bank of cylinders during operation of the engine in a limited bank operating mode in response to an operating time threshold being reached such that an operational bank of cylinders is disabled and a disabled bank of cylinders is made operational. The operating time threshold can include one of a temperature time threshold and a wear time threshold.

According to certain implementations, the method includes receiving input from a sensor to determine the operating load of the engine, the sensor operatively connected to the engine. In a further implementation, the method includes a plurality of fueling maps associated with an operating mode of the engine. At least one fueling map can be associated with operation of all banks of cylinders of the plurality of banks of cylinders and at least one different fueling map can be associated with operation of a bank of cylinders of the plurality of banks of cylinders and disablement of a bank of cylinders of the plurality of banks of cylinders.

In another implementation of the method, a fueling map associated with the limited bank operating mode defines an allocation of fuel injected into a cylinder, wherein fuel is injected into a cylinder of an operational bank of cylinders and no fuel is injected into a cylinder of a completely disabled bank of cylinders. In yet another implementation of the method, the cylinder bank command is sent to a component of the engine. The engine component can be actuated according to a predetermined value to produce a desired operating condition in response to receiving the cylinder bank command. The cylinder bank command can include the predetermined value.

In certain embodiments, an internal combustion engine system includes an internal combustion engine that includes a plurality of banks of cylinders. The system also includes a plurality of exhaust aftertreatment systems. Each aftertreatment system of the plurality of aftertreatment systems can be coupled to a respective bank of cylinders of the plurality of banks of cylinders. The system additionally includes a controller configured to operate the internal combustion engine on a single bank of cylinders of the plurality of banks of cylinders during a determined engine operating condition. In one implementation of the system, the controller disables the single bank of cylinders and makes operational a disabled bank of cylinders in response to an operating time threshold being reached. The operating time threshold can include a temperature time threshold or a wear time threshold.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Referring to the figures generally, systems and methods for an engine thermal management controls strategy that achieves targeted engine output exhaust temperatures for achieving DOC activation temperatures, desired DPF inlet temperatures for DPF regeneration events, desired SCR system temperatures for reducing and regenerating reductant deposit formations without the shortcomings of conventional engine output exhaust temperature control methods, and for achieving a hydrocarbon desorption event to prevent high temperature events in the aftertreatment system (i.e., during extended idling or low load operating conditions, hydrocarbons may be adsorbed onto the SCR catalyst that could result in excessively high temperatures when the engine load is increased) are disclosed herein.

Figure 1:
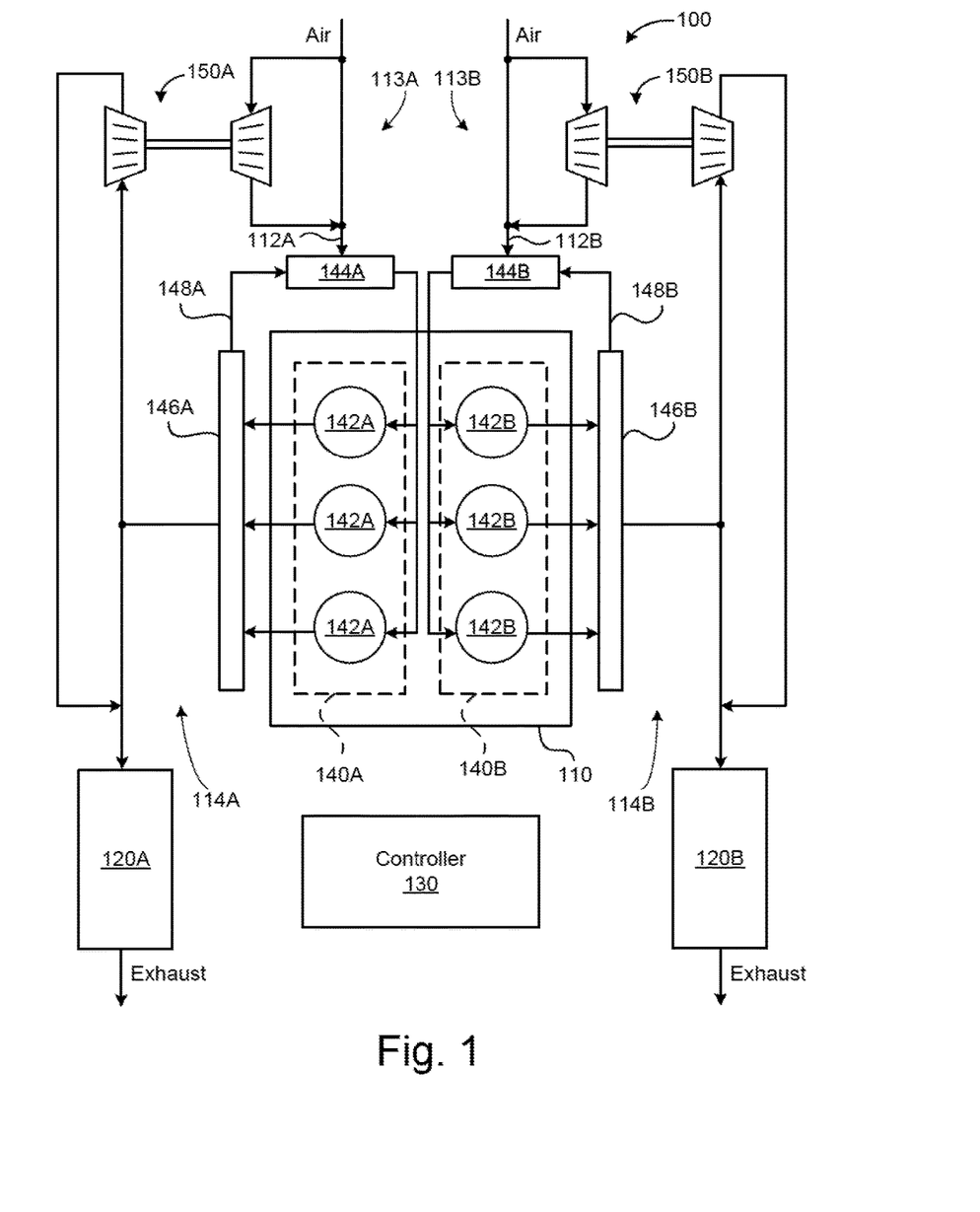
FIG. 1 is a schematic block diagram of an engine system having an internal combustion engine, exhaust aftertreatment systems, and a controller in accordance with one representative embodiment.

According to one embodiment depicted in FIG. 1, an internal combustion engine system 100 includes an internal combustion engine 110 powered by a fuel. Although not shown, the engine system 100 may be placed within or form part of a vehicle and be configured to operate and propel the vehicle. The engine 110 may be a diesel-powered engine, a gasoline-powered engine (e.g., operated lean), alternate-fuel-powered engine, or hybrid. The engine 110 generates power by combusting a fuel and air mixture within a plurality of combustion chambers or cylinders 142A, 142B housed by the engine. Typically, the cylinders 142A, 142B are formed in an engine block of the engine. As shown, the cylinders 142A, 142B are grouped into respective engine banks 140A, 140B. For example, the engine 110 includes six cylinders with the three cylinders 142A defining the engine bank 140A, and the three cylinders 142B defining the engine bank 140B.

The illustrated engine 110 and associated cylinders 142A, 142B schematically represents a six-cylinder engine, such as a V-6 engine. According to conventional V-type engines, the cylinders banks of the illustrated engine are positioned in a side-by-side configuration. However, the engine can be any of various types of engines with any number of cylinders that are groupable into any number of banks. For example, in one embodiment, the engine can be a V-8 type engine with eight cylinders and two side-by-side banks of cylinders each comprised of four of the eight cylinders. However, the engine can also be a straight or inline type engine with a single row of cylinders. For example, in one implementation, the engine is an I-6 type engine with six cylinders in a single row, but divided into two end-to-end banks of three cylinders.

In the illustrated embodiment, each bank 140A, 140B of cylinders 142A, 142B operatively receives air (and/or EGR) from one of two matching air handling systems 113A, 113B, respectively. Although the air handling systems 113A, 113B are separate and distinct from each other, the air handling systems have matching components. For example, the air handling system 114B has the same or similar features as the air handling system 114A, with like numbers referring to like features. Accordingly, the description of the air handling systems of the engine system 100 will proceed with reference to the air handling system 113A, with such description being equally applicable to the air handling system 113B.

The air handling system 113A includes an air inlet 112A and an intake manifold 144A. The air inlet 112A is vented to the atmosphere, which enables air from the atmosphere to enter the engine 110 via an intake manifold 144A. Also, air from the air inlet 112A can be redirected into the compressor of one or more turbochargers 150A via actuation of a flow regulating device. The compressor compresses the air before introducing it into the intake manifold 144A. The intake manifold 144A includes an outlet operatively coupled to each of the combustion cylinders 142A of the first cylinder bank 140A of the engine 110. The air from the atmosphere is combined with fuel to power, or otherwise, operate the engine 110. The fuel is selectively delivered into the combustion cylinders 142A of the bank 140A by a fuel delivery system (not shown). Each bank 140A, 140B can be fueled by a separate and distinct fuel delivery system if desired. The fuel delivery system can include a fuel tank for storing the fuel and a fuel pump for delivering the fuel to a common rail at a desired pressure. From the common rail, the fuel is injected into each of the combustion cylinders selected for fueling through at least one fuel injector associated with each cylinder. The fuel injectors can be separately controllable independently of each other, such that fuel can be injected into the cylinders of one bank, but not the cylinders of the other bank. The timing and dosage of fuel into the selected combustion chambers 142A is controlled by a controller 130 via electronic communication lines.

The combustion of air and fuel drives linearly-actuated or rotary-type pistons. The linear or rotational motion of the pistons rotates a crankshaft that transfers power to a drivetrain (e.g., transmission) of a vehicle to move the vehicle or to the input shaft of stationary equipment such as a pump or generator. The amount of power generated by the engine 110 is largely dependent upon the amount and timing of fuel added or injected into the combustion cylinders. For example, the more fuel added to and combusted in the combustion cylinders, generally the higher the power generated by the engine. The amount and timing of fuel added to the combustion cylinders is dependent upon a variety of operating conditions, such as engine speed, engine load (e.g., demand), vehicle speed, air intake characteristics, pressure, and temperature.

Generally, the amount of fuel to be added to the combustion cylinders, and the timing of such fuel injections relative to a crankcase angle, is obtained from a predetermined fuel map or maps storing fuel addition and/or timing values compared to operating condition values. For example, in one basic implementation, the fuel map includes fuel addition and/or timing values compared with engine speed and engine load demand values. Accordingly, in such an implementation, the amount of fuel to be added to the combustion cylinders is the fuel addition value corresponding with the current engine speed and desired or required engine load. In other implementations, in addition to the engine speed and engine load values, the fuel map also includes one or more additional current operating condition values, such as vehicle speed or driven equipment power requirement values, current air intake characteristics values (e.g., air intake mass flow values, are intake mass concentration values, etc.), current pressure values (e.g., air intake pressure, ambient air pressure, exhaust pressure, etc.), and current temperature values (e.g., air intake temperature, ambient air temperature, exhaust temperature, coolant temperature, oil temperature, etc.). Accordingly, in such other implementations, the amount of fuel to be added to the combustion cylinders is the fuel addition value corresponding with the current engine speed and desired engine load, and the one or more additional operating condition values at the current engine speed and desired engine load.

The fuel map for an internal combustion engine of a vehicle is typically stored in the vehicle's electronic control module (ECM) or controller. In the illustrated embodiment, the controller 130 of the system 100 stores at least one fuel map. The controller 130 communicates with and/or receives communication from various components of the system 100, such as the engine 110, an accelerator pedal, a clutch, one or more operating conditions sensors, and other possible components, such as on-board diagnostic systems. Generally, the controller 130 controls the operation of the engine system 100 and associated sub-systems, such as the engine 110. The controller 130 is depicted in FIG. 1 as a single physical unit, but can include two or more physically separated units or components in some embodiments if desired. In certain embodiments, the controller 130 receives multiple inputs, processes the inputs, and transmits multiple outputs. The multiple inputs may include sensed measurements from the sensors and various user inputs. The inputs are processed by the controller 130 using various algorithms, stored data, and other inputs to update the stored data and/or generate output values. The generated output values and/or commands are transmitted to other components of the controller and/or to one or more elements of the engine system 10 to control the system to achieve desired results, and more specifically, achieve desired fuel consumption characteristics.

Although not shown, the engine system 100 can include various physical sensors, such as temperature sensors, pressure sensors, fuel sensors, exhaust gas flow sensors, and the like, strategically disposed throughout the engine system and may be in communication with the controller 130 to monitor operating conditions. These and other operating conditions may also, or alternatively, be determined through the use of virtual sensors via model-based approaches. Engine operating conditions can be ascertained from any of the sensors or from the controller 130's commands to the engine regarding the fraction of exhaust gas recirculation, injection timing, and the like. In one embodiment, information is gathered regarding, for example, fueling rate, engine speed, engine load, fuel injection timing (e.g., SOI, or start of injection), time passed, fraction of exhaust gas recirculation, driving conditions, whether and when regenerations have occurred and the rate such regenerations have removed particulate matter, exhaust flow rate, the amount of $O_2$ and $NO_2$ in the exhaust, filter temperature, exhaust gas pressure, filter particulate load amount and uniformity, temperature measured in the exhaust and the aftertreatment system (e.g., of the exhaust gas itself or of various components within the aftertreatment system), etc.

Combustion of the fuel in the cylinders produces exhaust gas that is operatively vented to an exhaust system. In the illustrated embodiment, each bank 140A, 140B of cylinders 142A, 142B operatively vents exhaust gas to one of two matching exhaust systems 114A, 114B, respectively. Although the exhaust systems 114A, 114B are separate and distinct from each other, the exhaust systems have matching components. For example, the exhaust system 114B has the same or similar features as the exhaust system 114A, with like numbers referring to like features. Accordingly, the description of the exhaust systems of the engine system 100 will proceed with reference to the exhaust system 114A, with such description being equally applicable to the exhaust system 114B.

Following the combustion of fuel in the cylinders 142A of the first cylinder bank 140A, the resultant exhaust gas is vented to the exhaust manifold 146A. From the exhaust manifold 146A, the exhaust gas is directed into at least one of three systems or components, i.e., a turbocharger 150A, an EGR system 148A, and an exhaust gas aftertreatment system 120A. For example, based at least partially on the operating conditions of the engine, at least a portion of the exhaust gas can be directed into the turbocharger 150A, at least a portion of the exhaust gas can be directed into the EGR system 148A, and at least a portion of the exhaust gas can be directed into the exhaust aftertreatment system 120A. The relative portions of exhaust gas entering the respective systems or components 150A, 148A, 120A are controlled by the controller 130. Generally, the controller 130 determines the relative portions of exhaust gas that should enter the respective systems and commands valves (e.g., turbocharger bypass valve and an EGR valve) to allow a portion of the exhaust corresponding to the determined portions to enter the respective systems. Alternatively, some valves may be mechanically or passively controlled, such as a waste-gate valve on a turbocharger.

The turbocharger 150A includes a turbine, compressor, and turbocharger bypass valve. The turbocharger bypass valve is selectively operable to regulate the flow of exhaust gas into the turbocharger turbine. The exhaust gas entering the turbine causes the turbine to drive the compressor. When driven by the turbine, the compressor compresses engine intake air before directing it to the air inlet 112A and intake manifold 144A, where it can be combinable with EGR as will be explained in more detail below. Generally, the faster the rotational speed of the turbine, the more compressed the intake air. Accordingly, at high turbine speeds, the mass charge flow rate, i.e., the amount/mass of air per volumetric flow rate, is increased such that the amount of air entering the intake manifold 144 is increased even if the volumetric flow rate of air remains constant. In certain implementations, the turbocharger turbine is a variable geometry turbine (VGT) having a VGT device. The VGT device can be a series of movable vanes for controlling the flow of exhaust hitting the blades of the turbine. For example, in conventional applications, at low engine speeds, the exhaust velocity is insufficient to effectively spin the turbine. Accordingly, at low engine speeds, the vanes can be moved into a relatively closed position such that the spaces between the vanes are relatively small.

As the exhaust passes through the small spaces, it accelerates and is redirected to contact the turbine blades at a specific angle for optimum or fully-enhanced rotation of the blades. In other words, when in the closed position, the vanes accelerate and redirect exhaust to increase the turbine's speed and compression of the air. In contrast, at high engine speeds, the exhaust velocity is sufficient to effectively spin the turbine. Accordingly, at high engine speeds, the vanes can me moved into a relatively open position such that the spaces between the vanes are relatively large. As the exhaust passes through the large spaces, its velocity remains relatively constant and experiences minimal redirection such that the blades of the turbine experience a less enhanced rotation. The positions of the vanes are adjusted via an actuator in electrical communication with the controller 130 such that the controller can control the positions of the vanes.

The EGR system 148A includes an EGR valve (not shown) in the exhaust manifold and an EGR line between the exhaust manifold 146A and the air manifold 144. The EGR valve is selectively controlled by the controller 130 to regulate the flow of exhaust entering the EGR system 148A from the exhaust manifold, and thus indirectly regulating the flow of exhaust entering the aftertreatment system 120A. When the EGR valve is at least partially open, at least a portion of the engine exhaust enters the EGR system 148A and is re-circulated into the combustion chambers of the engine 110 to be combusted with air from the air intake manifold 144. Prior to entering the combustion chambers, the EGR exhaust gas can be passed through an EGR cooler (not shown) to cool the exhaust gas in order to facilitate increased engine air inlet density.

In addition to the VGT device of the turbocharger 150A and the EGR valve of the EGR system 148A, the flow rate of exhaust entering the exhaust aftertreatment system 120A can be regulated by an exhaust throttle (not shown) positioned within the exhaust stream between the aftertreatment system 120A and the turbocharger 150A. Like the VGT device, the exhaust throttle is actuatable between a closed position and an open position. The closed position corresponds with a minimum space through which exhaust gas can pass and the open position corresponds with a maximum space through which exhaust gas can pass. As the space through which the exhaust flows is reduced, the flow rate of the exhaust is reduced. Therefore, as the exhaust throttle moves from the open position to the closed position, the flow rate of exhaust entering the aftertreatment system decreases. Similarly, as the exhaust throttle moves from the closed position to the open position, the flow rate of exhaust entering the aftertreatment system increases.

The valve positions of the VGT device, EGR valve, intake throttle, and exhaust throttle affect the load on the engine and thus the temperature of the exhaust gas. For example, when the VGT device is in a closed position, a backpressure is created in the exhaust manifold. In order to overcome the backpressure in the exhaust, the engine must increase its pumping work. The increased pumping work results in an increase in the engine output exhaust gas temperature. Similar to the VGT device, the more closed the exhaust throttle valve position, the more backpressure created in the exhaust manifold, and the more pumping work performed by the engine. Accordingly, in certain instances, the temperature of the engine output exhaust can be increased by closing at least one of the VGT device and exhaust throttle. For example, in some implementations, the VGT device and exhaust throttle can be controlled independent of each other to increase the engine output exhaust gas temperature. Alternatively, the VGT device and exhaust throttle can be dependently or cooperatively controlled to provide more precise control of the engine output exhaust temperature.

Further, assuming constant EGR flow rates, because less air is entering the combustion chambers when the VGT device, intake throttle, and/or exhaust throttle are closed, the temperature of exhaust gas is increased due to the lower air-to-fuel ratio of the air-fuel mixture being combusted.

The exhaust aftertreatment system 120A may include any of various components for reducing regulated emissions in the exhaust gas. For example, although not shown, the exhaust aftertreatment system 120A can include a catalytic component (e.g., a DOC), a particulate filter downstream of the catalytic component, and an SCR system. The exhaust gas may pass through the catalytic component to reduce the number of pollutants in the exhaust gas prior to the gas entering the particulate filter. In certain implementations, the catalytic component is a conventional DOC. The pollutants, e.g., carbon monoxide, particulate matter, and hydrocarbons, are reduced in an oxidation process within the catalytic component. Typically, for oxidation of the pollutants to occur, the catalyst of the catalytic component should be at a temperature above a predetermined value, e.g., above about 250° C. or about 300° C. in some instances. The temperature of the catalytic component can be regulated by controlling the engine output exhaust temperature. The exothermic oxidation process for reducing the pollutants in the exhaust also causes the temperature of the exhaust to increase such that during an oxidation event on the catalytic component, the catalytic component outlet temperature is greater than the catalytic component inlet temperature.

In some implementations, fuel is added to the exhaust prior to entering the catalytic component. In certain instances, the fuel is added via internal injections (e.g., heat post-injections and/or non-heat post-injections) and/or external injections. The added fuel raises the temperature of the exhaust exiting the catalytic component by participating in the exothermic oxidation reaction. The increase in exhaust gas temperature across the catalyst device will depend on the amount of fuel introduced, the efficiency of the catalytic device in oxidizing the fuel, heat losses, and exhaust gas mass flow rate (and exhaust gas heat capacity).

The particulate filter filters particulate matter from the exhaust gas stream. The particulate matter can build on the face of the particulate filter catalyst. Particulate matter produced by the engine 110 comprises ash and soot. Soot accumulates much faster than ash, such that, in many cases, particularly when the filter has been in operation for a relatively short period, an estimate of the rate of total particulate accumulation can be satisfactorily generated by estimating the rate of soot accumulation, treating the ash accumulation rate as negligible. Accordingly, the particulate filter requires periodic regeneration to remove the particulate matter from the filter.

The SCR system requires the introduction of a reductant. Accordingly, the SCR system may include a reductant delivery system that includes a reductant source, a pump, and reductant delivery mechanism (e.g., an injector). The reductant source can be a container or tank capable of retaining reductant, such as, for example, ammonia ($NH_3$) or a urea solution. The reductant source is in reductant supplying communication with the pump, which is configured to pump reductant from the reductant source to the reductant delivery mechanism. In the illustrated embodiment, the reductant delivery mechanism is coupled to the exhaust tube at a location upstream of an SCR catalyst and downstream of the DPF. However, in other embodiments, the reductant delivery mechanism may be positioned at other locations within the system (e.g., the reductant continues to be introduced upstream of the SCR catalyst, but the DPF may not necessarily be immediately upstream of the reductant introduction point). The SCR system further includes a reductant decomposition tube or pipe (e.g., a decomposition reactor pipe (DRP)) defined as the portion of the exhaust tube downstream of the reductant delivery mechanism and upstream of the SCR catalyst. The delivery mechanism includes an injector that is selectively controllable to inject reductant directly into the exhaust gas stream through an injector introduction opening or tube in the reductant decomposition tube. Although not shown, the SCR system 230 can include a mixer plate installed within the reductant decomposition tube upstream of the SCR catalyst 234 and downstream of the reductant injector and injector introduction opening.

In some embodiments, the reductant is a urea-water solution, which decomposes as it travels through the reductant decomposition tube to produce ammonia as discussed above. The ammonia reacts with $NO_x$ in the presence of the SCR catalyst to reduce the $NO_x$ to innocuous constituents, such as $N_2$ and $H_2O$. The capability of the SCR catalyst to reduce $NO_x$ is largely dependent upon the capability of the reductant to decompose to ammonia. As discussed above, in some instances, all of the injected reductant may not completely decompose to ammonia due to low temperature regions of exhaust gas within the reductant decomposition tube or low temperatures throughout the exhaust gas. Sometimes, some injected reductant may contact the inner walls of the reductant decomposition tube, mixer plate within the decomposition tube, the reductant injector introduction tube, or the reductant injector itself. Incomplete decomposition of reductant into ammonia and reductant sprayed onto the walls of the reductant decomposition tube may lead to the formation of solid reductant deposits on the inner walls of the reductant decomposition tube, and in some cases the reductant injector, reductant injector introduction tube, and mixer plate. Solid reductant deposits can negatively affect the performance of the engine and aftertreatment systems as described above.

Additionally, low temperatures in the exhaust gas can lead to UHC deposits (adsorption) within the exhaust system, particularly the exhaust aftertreatment system of the exhaust system.

The schematic representation of the engine system 100 in FIG. 1 is merely one type of engine configuration that may be utilized in conjunction with the present subject matter. In some embodiments, the engine system 100 may not have dual air handling and exhaust systems with each one associated with a respective bank of cylinders. For example, the engine system 100 may have one air handling system (e.g., one turbocharger, one EGR system, and one air intake manifold) that supplies air to both banks, and one exhaust system (e.g., one exhaust manifold, one EGR system, and one exhaust aftertreatment system) that receives exhaust gas from both banks of cylinders. Typically, this particular embodiment would include a means of shutting off or substantially reducing the exhaust flow from the deactivated bank to limit cooling of exhaust from the active bank when mixed with exhaust from the deactivated bank. This could be accomplished by various means such as valve deactivation, an intake throttle, or an exhaust throttle applied to each bank. Further, some configurations of the engine system 100 with dual air handling and exhaust systems can be slightly, and even significantly, different than the configuration illustrated in FIG. 1 without departing from the essence of the subject matter of the present disclosure.

Although high exhaust temperatures may be desirable for various reasons, such as DPF regeneration, SCR system regeneration, and reductant deposit prevention or clean-up, often at low operating loads of an engine, the temperature of the exhaust gas is correspondingly low. As discussed above, there are many techniques for increasing the temperature of exhaust gas for regeneration or reductant deposit prevention purposes. For example, non-additive fuel injection strategies, such as adjusting a VGT device, an exhaust throttle, an intake throttle, an EGR valve, a waste-gate, fuel injection amount for combustion, fuel injection timing, and the like, as well as additive fuel injection strategies, such as internal and external post-combustion strategies. However, most strategies for increasing the temperature of exhaust gas result in an increase in fuel consumption.

As will be described in more detail below, the engine system 100 of the present disclosure is configured to increase the temperature of exhaust gas in low load operating conditions without necessarily increasing the fuel consumption or the load on the engine by shutting down at least one bank of cylinders (e.g., the second bank 140B) during low load operating conditions. With at least one bank of cylinders shut down, the bank of cylinders that remains operational (e.g., the first bank 140A) must then carry the load previously provided by the shutdown bank. In other words, with fewer operational cylinders, the cylinders that are operational must work harder to maintain the load required by the engine 110, even during low load operating conditions.

Further, because the operational bank of cylinders 142A are working harder, the temperature of the exhaust gas generated by the combustion events within the operational cylinders 142A is higher than when the load was distributed over both banks 140A, 140B of cylinders. In this manner, a higher exhaust gas temperature is achieved without increasing the load on the engine and without necessarily increasing the fuel consumption of the engine. Of course more fuel is required to power the increased load on the operational bank 140A, but because no fuel is being consumed on the non-operational bank 140B, the overall fuel consumption remains relatively constant. The increased exhaust temperature from the operational bank 140A of cylinders 142A helps facilitate regeneration events within the exhaust aftertreatment system 120A, and reduces the buildup of reductant and UHC deposits within the aftertreatment system 120A, without an increase in fuel consumption.

Figure 2:
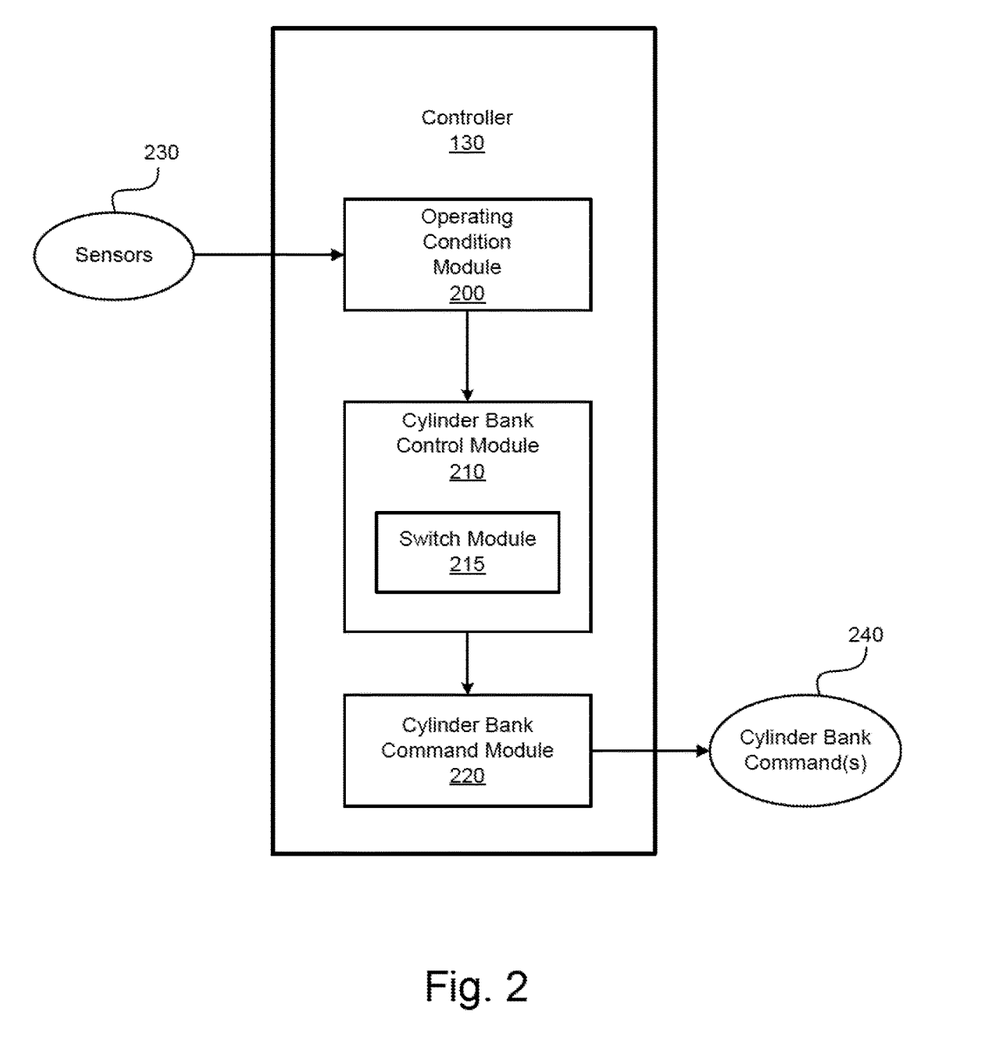
FIG. 2 is a schematic block diagram of the controller of FIG. 1 in accordance with one representative embodiment.

The controller 130 includes various modules and stores information for controlling the operation of the engine system 100. For example, as shown in FIG. 2, the controller 130 includes an operating condition module 200, a cylinder bank control module 210, and a cylinder bank command module 220. Generally, the modules 200, 210, 220 of the controller 130 cooperate to generate one or more cylinder bank commands 240 requesting one or more operating conditions of the operational cylinder bank or banks of the engine 110, such as those associated with load or torque demand (e.g., the amount of fuel to be injected, timing of the fuel injection (SOI), etc.). Although not shown, the controller 130 may also include one or more thermal management modules configured to execute and control various thermal management processes for further increasing the exhaust gas temperature as needed. For example, for some applications, the increase in the exhaust gas temperature by shutting down a bank of cylinders may provide only part of the exhaust gas temperature increase necessary to perform a regeneration event. Accordingly, additional procedures must be implemented to achieve higher exhaust gas temperatures. Such procedures include one or more of any of various known thermal management procedures, such as, for example, manipulation of a VGT device, an exhaust throttle, an intake throttle, an EGR valve, fuel injection amount for combustion, engine speed, fuel injection timing (e.g., retarding fuel injection or post-fuel injections), and the like, as well as additive fuel injection strategies, such as internal and external post-combustion strategies.

According to one embodiment, the operating condition module 200 is configured as a load condition module that is generally configured to determine the load at which the engine 110 is operating. In one embodiment, the module 200 receives input from one or more sensors 230 throughout the engine system 100. One of the sensors 230 may be an engine speed sensor that detects a speed of the engine (e.g., the rotational speed of a driveshaft of the engine). The module 200 may be configured to determine the engine load based on the sensed engine speed. In some embodiments, the engine load may be determined by the module 200 using other techniques and methods, and/or relying on additional sensed operating conditions of the engine, such as intake air flow, intake air temperature, atmospheric pressure, and the like.

According to various other embodiments, the operating condition module 200 may be configured to receive input from one or more sensors 230 throughout the engine system 100 regarding various other operating conditions (in addition to the engine load like described above). For example, the operating condition module 200 may receive information regarding an exhaust stream temperature, a fuel rate, an intake manifold pressure, a coolant temperature, an intake air temperature, etc. The operating condition module 200 may communicate this information to the cylinder bank control module 210 to determine and implement the appropriate cylinder bank operating mode.

In the example where the operating condition module 200 is configured as a load condition module, the operating load of the engine 110 is communicated to the cylinder bank control module 210. Based on the operating load of the engine 110, the cylinder bank control module 210 is configured to select which of multiple banks of cylinders should be operational and which, if any, of the multiple banks of cylinders should be temporarily shut down. Basically, in some implementations, the cylinder bank control module 210 requests the temporary disablement or shutting down of at least one bank of multiple banks of cylinders when the operating load of the engine 110 is below a low load threshold and, in some implementations, when thermal management is needed. In other words, when the engine is operating within a low load operating condition range, the cylinder bank control module 210 issues instructions to stop the use of at least one bank of cylinders while maintaining the use of at least one other bank of cylinders. According to various other embodiments, the cylinder bank control module 210 may issue instructions to temporarily disable or shut down at least one bank of multiple banks of cylinders based on a variety of different conditions, such as a low exhaust gas temperature or a low intake manifold pressure, in addition to or separate from a low load threshold. In the illustrated embodiment, the cylinder bank control module 210 may act to shut down the bank 140B of cylinders 142B and keep the bank 140A of cylinders 142A operating. The cylinder bank control instructions or requests regarding which bank or banks of multiple banks should be shut down or remain operation is communicated to the cylinder bank command module 220. Accordingly, the cylinder bank command module 220 generates a cylinder bank command 240 that is provided to at least one of the banks of cylinder to effect the request provided by the control module 210 to the command module 220.

The cylinder bank control module 210 may disable operation (via command module 220) in the limited bank operating mode under certain operating conditions (from operating condition module 200), such as, for example, during engine start-up, when coolant temperature is below a threshold, during synchronization with a grid, when a transient event is anticipated, and the like based on the operating load of the engine 110.

The cylinder bank command module 220 generates cylinder bank command(s) 240 based on the cylinder bank control instructions received from the cylinder bank control module 210 that are provided to at least one of the banks of cylinders and, in some embodiments, the cylinders themselves. Although not shown, the cylinder bank command module 220 includes multiple predetermined fueling maps (e.g., torque-speed maps). Each fueling map is associated with a respective operating mode of the engine 110. For example, one or more fueling maps are associated with a normal operating mode and one or more fueling maps are associated with a limited bank operating mode. The normal operating mode is associated with operation of all the cylinder banks of multiple possible cylinder banks. In contrast, the limited bank operating mode is associated with operation of at least one of the cylinder banks of multiple possible cylinder banks, and shutting down of at least one of the cylinder banks of the multiple possible cylinder banks. According to various other embodiments, the limited bank operating mode may also be associated with the operation of at least one of the cylinder banks of the multiple possible cylinder banks, and the partial disablement of at least one of the cylinder banks of the multiple possible cylinder banks (rather than the complete disablement). The partial disablement may include operation of the cylinder(s) in the partially disabled cylinder bank at a relatively lower output power than that of the non-disabled cylinder(s) in the operational cylinder bank. In the illustrated embodiment, the cylinder bank command module 220 includes at least one fueling map associated with operation of both banks 140A, 140B of cylinders 142A, 142B, and at least one fueling map associated with operation of one of the banks 140A, 140B of cylinders 142A, 142B and disablement of the other of the banks of cylinders. The cylinder bank command(s) 240 represent the predetermined values obtained from the appropriate fueling map(s). The cylinder bank command(s) 240 are sent to various components of the engine system 100 (e.g., fuel injectors, throttle body or other throttling valves, intake and exhaust valves (i.e., the mechanism that opens and closes the valves), bypass valves (e.g., wastegates, compressor bypass valves, etc.), variable geometry turbochargers, etc.), which are actuated according to the predetermined values in response to receiving the commands to produce a desired operating condition. For example, the cylinder bank command(s) 240 may include a fuel injection command, which when received by the fuel injectors of operational cylinders, the fuel injectors inject fuel into the operational cylinders according to the fuel injection amount represented by the fuel injection command.

Comparatively, for a given engine load and speed, the fueling map or maps associated with the normal operating mode will demand lower fueling rates into each cylinder of the multiple banks of cylinders than the fueling map or maps associated with the limited bank operating mode. As described above, because in the limited bank operating mode fewer banks of cylinders are required to generate the same load as all the banks of cylinders in the normal operating mode, more fuel is required to be injected into the cylinders of the operating bank or banks of cylinders. To compensate for the additional fuel demands of the fueling maps for the operational bank or banks of cylinders during the limited bank operating mode, the fuel demands of the fueling maps for the non-operational or disabled bank or banks of cylinders for the same engine torque and speed are zero. In other words, the fueling maps associated with the limited bank operating mode will demand some fuel be injected into the cylinders of the operational banks and no fuel be injected into the cylinders of the non-operational banks. According to various other embodiments, the non-operational banks may include deactivation of the valves (e.g., the intake and exhaust valves) for those banks as well. As such, in this embodiment, no fuel or air flow is permissible through the deactivated valves for the non-operational banks and all the exhaust may flow from the operational banks into the exhaust and aftertreatment systems.

During operation in the limited bank operating mode, because no fuel is being injected into the cylinders of the non-operational banks, only intake air (and possible EGR) is being passed from the cylinders into the exhaust system. For example, in the illustrated embodiment, while the first bank 140A of cylinders 142A is operating to produce the load demanded by the cylinder bank command 240, the second bank 140B of cylinders 142B is not receiving fuel such that just intake air is being passed into the exhaust system 114B. The intake air flowing through the exhaust system 114B is relatively cold compared to the combustion exhaust gas flowing through the exhaust system 114A. The low temperature of the intake air thus results in a drop in the temperature of the components of the exhaust system 114B (e.g., the exhaust aftertreatment system 120B). As discussed above, low exhaust temperatures and low aftertreatment system component temperatures result in poor performance of the aftertreatment system, including reductant and UHC deposit formation.

As discussed above, during low load operating conditions in the limited bank operating mode, the exhaust system 114B may not be in use. Accordingly, a drop in the temperature of the components of the exhaust system 114B does not negatively impact the performance of the engine system 100. However, should operation of the engine 110 quickly change from low load operating conditions (and operation in the limited bank operating mode) to medium or high mode operating conditions (and operation in the normal operating mode) requiring activation of the non-operational bank of cylinders (e.g., cylinder bank 140B), if the temperature of the components of the exhaust system 114B is low, then the aftertreatment system 120B may not be able to adequately reduce the emissions in the combustion exhaust gases now flowing through the exhaust system 114B.

To reduce the potentially negative consequences of a cold exhaust aftertreatment system associated with the shut off of a bank of cylinders, the cylinder bank control module 210 may include a switch or timer module 215. The switch module 215 is configured to switch operation of multiple cylinder banks during operation in the limited bank operating mode after a first predetermined time threshold (e.g., temperature time threshold) has been met. In other words, if one cylinder bank (e.g., cylinder bank 140A) has been operational, and another cylinder bank (e.g., cylinder bank 140B) has been non-operational, for a predetermined time, then the switch module 215 commands the cylinder bank command module 220 to switch the operational cylinder bank to non-operational, and switch the non-operational bank to operational. The temperature time threshold is selected to ensure that the exhaust aftertreatment system components associated with the non-operational bank do not fall below a desired temperature threshold. In some implementations, the temperature time threshold may vary based on one or more variable factors, such as ambient temperature, engine load conditions, and the like. Basically, the switch module 215 is configured to switch operation of cylinder banks before the exhaust aftertreatment system of the non-operation bank drops below the desired temperature threshold.

In addition to keeping the components of non-operational exhaust aftertreatment systems warm, thus ready for accommodating transitions to higher engine loads, switching operation between multiple cylinder banks during operation in the limited bank operating mode also reduces uneven wear between the cylinder banks. Operating one cylinder bank for a disproportional amount of time relative to another cylinder bank may result in the overused cylinder bank having greater wear than the underused cylinder bank. Accordingly, to avoid uneven wear between selectively operation cylinder banks, the switch module 215 may also be configured to track the amount of time each cylinder bank remains operational during operation in the limited bank operating mode, and switch operation of the cylinder banks if the operational time of one cylinder reaches a second predetermined time threshold (e.g., wear time threshold). In one implementation, the wear time threshold may be defined as the maximum operating period that one cylinder bank of multiple banks may be operational while another of the cylinder banks is non-operational. The tracked time or operating period for an operational cylinder bank may be reset to zero after switching to a non-operational state. Moreover, the tracked time need not be continuous in some implementations. According to various other embodiments, the switch module 215 may also include a predetermined temperature threshold that activates the switch operation of the cylinder banks. For example, if an exhaust or aftertreatment system (or cylinder) temperature exceeds a certain level, or if a certain temperature has occurred past a predetermined length of time, or if the temperature in the disabled bank drops below a certain level, then the switch module 215 may initiate the switching operation.

Figure 3:
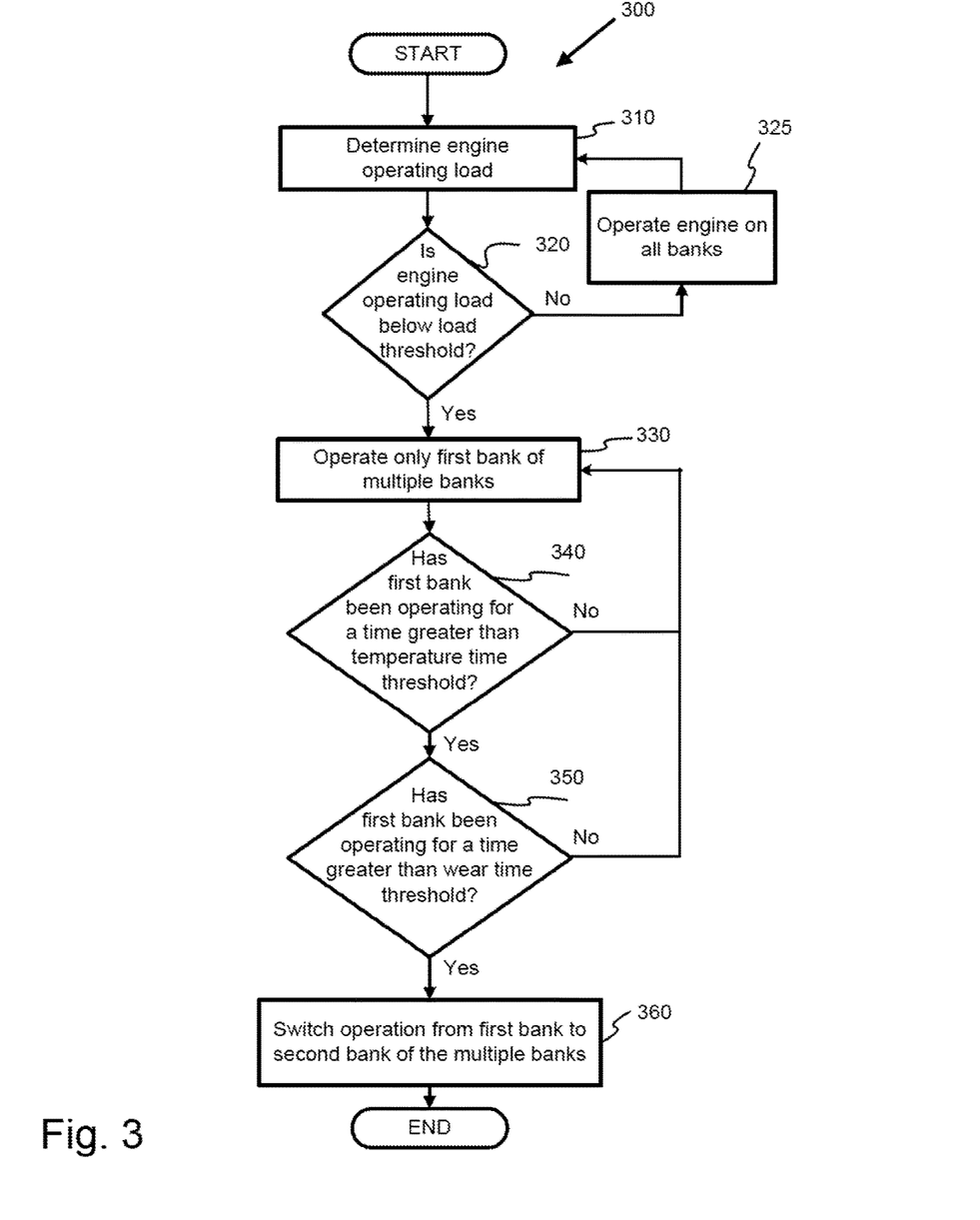
FIG. 3 is a schematic flow chart diagram of one embodiment of a method for controlling a thermal management operation of an engine system.

Referring to FIG. 3, one embodiment of a method 300 for controlling the thermal management of an engine may be executed by the one or more of the modules described above. The method 300 begins by determining the operating load of an internal combustion engine at 310. The method 300 then determines whether the engine operating load is less than a load threshold at 320. If the engine operating load is more than the load threshold as determined at 320, then the method 300 operates all banks of the engine at 325, and again determines the engine operating load at 310 and executes the query at 320. However, if the engine operating load is less than the load threshold as determined at 320, then the method 300 proceeds to operate the engine in a limited bank operating mode by operating only one bank of multiple banks of cylinders at 330. In some implementations with more than two banks of cylinders, the method 300 may operate only one or two of the three banks. The non-operational banks are simply not used for combustion (i.e., fuel is not injected into the non-operational cylinders).

After operating the first bank of multiple banks at 330, the method 300 determines whether the first bank has been operating for a time greater than a temperature time threshold at 340. If the first bank has been operating for a time that is less than the temperature time threshold, then the method 300 continues to operate only the first bank of cylinders at 330. However, if the first bank has been operating for a time that is greater than the temperature time threshold, then the method 300 determines whether the first bank has been operating for a time greater than a wear time threshold at 350. If the first bank has been operating for a time that is less than the wear time threshold, then the method 300 continues to operate only the first bank of cylinders at 330. However, if the first bank has been operating for a time that is greater than the wear time threshold, then the method 300 proceeds at 360 to switch operation of the cylinder banks such that operation of the first bank is stopped, and operation of a second bank of cylinders is started. Alternatively, the switch operation may be based on a temperature threshold, like that described above (e.g., the operational bank temperature exceeds a predetermined value). Then the method 300 ends.

In some implementations, the method 300 may then restart after ending or return to determine the engine load at 310 after executing the step at 360. If the engine is operating above the load threshold at 320, then the engine may switch from operation in the limited bank operating mode to the normal operating mode, which includes re-starting operation of the first bank of cylinders such that both or all cylinder banks are operational. However, if the engine is operating below the load threshold at 320, then the method proceeds as described above, but with the analysis based on operation of the second bank of cylinders, as opposed to the first bank, such that operation of only the second bank of multiple banks occurs at 330, and switching operation from the second bank back to the first bank at 360. Generally, if at any time during operation of the engine in the limited bank operating mode the engine operating load rises above the load threshold, operation in the limited bank operating mode ceases and operation in the normal operating mode is initiated.

In regard to system 100, the example of FIG. 3 corresponds with the operating condition module 200 being configured as a load condition module configured to monitor the engine load. According to various other embodiments, when operating condition module 200 is configured for the detection of general operating conditions, step 310 may correspond with the determination of an engine operating condition. As mentioned above, general operating conditions may include, but are not limited to, an exhaust stream temperature, an intake manifold pressure, a fuel rate, an intake temperature, a coolant temperature, etc. Accordingly, step 320 may correspond with "whether the operating condition is at an acceptable level to allow a limited cylinder bank operation mode." If the operating condition is not at an acceptable level, step 325 would provide for the normal operating mode (i.e., operate engine on all banks). For example, if the exhaust stream temperature is below a threshold value, then step 325 would occur, which provides for the normal operating mode. If the operating condition is at an acceptable level, the remaining steps of method 300 may be performed.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus for controlling an exhaust gas temperature generated by an internal combustion engine comprising a plurality of banks of cylinders, the apparatus comprising:
   an operating condition module configured to determine an operating load of the internal combustion engine;
   a cylinder bank control module configured to select a limited bank operating mode when the determined operating load is below a predetermined threshold and to send a cylinder bank control instruction comprising the selected limited bank operating mode;
   a cylinder bank command module configured to generate a cylinder bank command based on the cylinder bank control instruction so that a first bank of cylinders of the plurality of banks of cylinders is at least partially disabled and operation of a second bank of cylinders of the plurality of banks of cylinders is enabled; and
   a switch module configured to at least partially enable operation of the first bank of cylinders and at least partially disable operation of the second bank of cylinders during operation of the internal combustion engine in the limited bank operating mode in response to an operating time threshold comprising one of a temperature time threshold and a wear time threshold being reached, wherein the temperature time threshold is a preset time configured to keep an exhaust aftertreatment system component above a desired temperature threshold.

2. The apparatus of claim 1, wherein the cylinder bank control module is further configured to select a normal operating mode wherein all banks of cylinders of the plurality of banks of cylinders are enabled.

3. The apparatus of claim 1, wherein the at least partially disabled first bank of cylinders provides a relatively lower output power than the enabled second bank of cylinders.

4. The apparatus of claim 1, wherein the operating condition module receives input from a sensor to determine the operating load of the engine, the sensor being connected to at least one of the engine, a transmission system, and the aftertreatment system.

5. The apparatus of claim 1, wherein the cylinder bank command module comprises a plurality of fueling maps, wherein at least one fueling map is associated with operation of all banks of cylinders of the plurality of banks of cylinders, and wherein at least one different fueling map is associated with the limited bank operating mode.

6. The apparatus of claim 1, wherein a fueling map associated with the limited bank operating mode defines an allocation of fuel injected into a cylinder, wherein fuel is injected into a cylinder of the first bank of cylinders and no fuel is injected into a cylinder of the second bank of cylinders.

7. The apparatus of claim 1, wherein the cylinder bank command comprises a predetermined value and is sent to an engine component to be actuated according to the predetermined value to produce a desired operating condition.

8. The apparatus of claim 7, wherein the engine component includes at least one of a throttling valve, a fuel injector, a mechanism that actuates an intake valve, a mechanism that actuates an exhaust valve, a bypass valve, and a variable geometry turbocharger.

9. A method for controlling an exhaust temperature generated by an internal combustion engine comprising a plurality of banks of cylinders, the method comprising:
   determining an operating load of the internal combustion engine;
   selecting a limited bank operating mode when the determined operating load is below a predetermined load threshold;
   generating a cylinder back control instruction comprising the selected limited bank operating mode;
   generating a cylinder bank command based on the cylinder bank control instruction
   partially disabling a first bank of cylinders of the plurality of banks of cylinders in response to the cylinder bank command;
   enabling operation of a second bank of cylinders of the plurality of banks of cylinders in response to the cylinder bank command; and
   switching operation of the first bank of cylinders and the second bank of cylinders so that the first bank of cylinders is enabled and the second bank of cylinders is at least partially disabled during operation of the internal combustion engine in the limited bank operating mode in response to an operating time threshold comprising one of a temperature time threshold and a wear time threshold being reached, wherein the temperature time threshold is a preset time configured to keep an exhaust aftertreatment system component above a desired temperature threshold.

10. The method of claim 9, further comprising selecting a normal operating mode, wherein all banks of cylinders of the plurality of banks of cylinders are enabled.

11. The method of claim 10, further comprising providing fuel to the plurality of banks of cylinders according to a plurality of fueling maps, wherein at least one fueling map is associated with operation of all banks of cylinders of the plurality of banks of cylinders in the normal operating mode, and wherein at least one different fueling map is associated with operation of the plurality of banks of cylinders in the limited bank operating mode.

12. The method of claim 9, wherein the at least partially disabled first bank of cylinders provides a relatively lower output power than the enabled second bank of cylinders.

13. The method of claim 9, further comprising receiving an input from a sensor to determine the operating load of the engine, the sensor operatively connected to the engine.

14. The method of claim 9, wherein enabling operation of the second bank of cylinders comprises injecting fuel into a cylinder of the second bank of cylinders according to an allocation defined by a fueling map associated with the limited bank operating mode, and wherein partially disabling the first bank of cylinders comprises inhibiting injection of fuel into a cylinder of the first bank of cylinders according to the allocation defined by the fueling map.

15. The method of claim 9, wherein the cylinder bank command comprises a predetermined value, and further comprising sending the cylinder bank command to an engine component to be actuated according to the predetermined value to produce a desired operating condition.

16. An internal combustion engine system comprising:
an internal combustion engine comprising a plurality of banks of cylinders;
a plurality of exhaust aftertreatment systems, wherein each aftertreatment system of the plurality of aftertreatment systems is coupled to a respective bank of cylinders of the plurality of banks of cylinders; and
a controller configured to operate the internal combustion engine on a single bank of cylinders of the plurality of banks of cylinders in response to an engine operating condition,
wherein the engine operating condition includes an engine load amount being below a threshold value and an exhaust gas temperature below a threshold value,
wherein the controller disables the single bank of cylinders and makes operational a disabled bank of cylinders in response to an operating time threshold being reached, the operating time threshold comprising at least one of a temperature time threshold and a wear time threshold, wherein the temperature time threshold is a preset time configured to keep a component in an exhaust aftertreatment system above a desired temperature threshold.

17. An apparatus for controlling an exhaust temperature generated by an internal combustion engine comprising a plurality of banks of cylinders, the apparatus comprising:
an operating condition module configured to determine an operating load of the internal combustion engine;
a cylinder bank control module configured to select a limited bank operating mode in response to the determined operating load being less than a predetermined load threshold and to send a cylinder bank control instruction comprising the selected limited bank operating mode;
a cylinder bank command module configured to generate a cylinder bank command based on the cylinder bank control instruction so that a first subset of the plurality of banks of cylinders is operated differently from the other banks of cylinders in the plurality of banks of cylinders; and
a switch module configured to operate a second subset of the plurality of bank of cylinders differently from the other banks of cylinders in the plurality of bank of cylinders during operation of the internal combustion engine in the limited bank operating mode in response to an operating time threshold comprising one of a temperature time threshold and a wear time threshold being reached, wherein the temperature time threshold is a preset time configured to keep a component in an exhaust aftertreatment system above a desired temperature threshold.

18. The apparatus of claim 17, wherein in the limited bank operating mode, the cylinder bank control module selects the at least one bank of cylinders to be operated differently.

19. The apparatus of claim 17, wherein the limited bank operating mode includes an at least partial disabling of the first subset.

20. The apparatus of claim 17, wherein the cylinder bank control module is further configured to select a normal operating mode wherein all banks of cylinders of the plurality of banks of cylinders are enabled.

* * * * *